Patented July 14, 1942

2,289,383

UNITED STATES PATENT OFFICE 2,289,383

CALCIUM OXIDE-CHROMIUM OXIDE-ALUMINUM OXIDE REFRACTORY

Gordon R. Pole, near Sheffield, Ala.

No Drawing. Application September 4, 1941, Serial No. 409,542

3 Claims. (Cl. 106—63)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the art of making highly refractory compositions and articles of manufacture therefrom.

The principal object of this invention is to produce a high melting point refractory which will withstand the corrosive action of basic slags and other basic melts, such as fused rock phosphate. Another object of this invention is to produce a calcium oxide-chromium oxide refractory with physical and chemical characteristics such that the structure of the refractory will not be materially affected by repeated treatment at high temperatures. Still another object of this invention is to provide a calcium oxide-chromium oxide refractory which is also stable in the presence of water vapor at relatively low temperatures. A further object of this invention is to provide a refractory which has high load-bearing characteristics at high temperatures. Other objects of this invention include the provision of a rapid and relatively economical procedure for the production of a stable refractory from commercial raw materials suitable for use at relatively high temperatures when in contact with corrosive basic materials.

I have discovered a new high melting point refractory and articles of manufacture produced from the same made by firing a mixture of substantial proportions of calcium oxide and chromium oxide with a minor proportion of aluminum oxide such that the composition is characterized by its high load-bearing quality at high temperatures of the order of more than 1600° C., its resistance to fused basic materials such as rock phosphate at temperatures of the order of 1500° to 1550° C., and by its resistance to hydration in air or in boiling water. The compositions and articles of manufacture of the present invention are composed of the following essential constituents in approximately the proportions stated: 40 to 60 mol percent calcium oxide, 50 to 20 mol percent chromium oxide, and 1 to 20 mol percent aluminum oxide. A preferred narrower range of the essential constituents adapted specifically for use in contact with basic materials at high temperatures is as follows: 45 to 55 mol percent calcium oxide, 54 to 35 mol percent chromium oxide, and 1 to 10 mol percent aluminum oxide. A more specific composition of essential constituents particularly adapted for use in contact with a basic material of the character of fused rock phosphate is approximately as follows: 54 mol per cent calcium oxide, 43 mol percent chromium oxide, and 3 mol percent aluminum oxide.

One example for the production of highly refractory material according to my invention is given for the production of nine-inch standard size refractory brick. A mixture of 30 percent by weight (54 mol percent) of calcium oxide of approximately 200 mesh, 67 percent by weight (44 mol percent) of chromium oxide of approximately 200 mesh, and 3 percent by weight (3 mol percent) of aluminum oxide was dry-pressed and fired to 1550° C. The fired material was crushed to the proper particle size to give dense packing, water and 1 percent by weight of a temporary bonding agent admixed therewith, the bricks dry-pressed therefrom in a steel mold under a pressure of 4,000 pounds per square inch, and fired in a refractory kiln at 1550° C. These bricks tested against fused rock phosphate at 1600° to 1650° C. were found to be of the order of four to five times more resistant to corrosion than the best available commercial chrome-magnesia refractory tested under the same conditions. Fusion tests on the calcium oxide-chromium oxide-aluminum oxide refractory showed a cone fusion point of 40 (approximately 1885° C.). This brick sheared at 1670° C. when tested under a load of 25 pounds per square inch, as compared with a shear temperature of 1400° to 1450° C. for commercial grades of magnesite or chrome-magnesia refractory brick tested under the same conditions.

Other examples for the production of highly refractory material according to my invention are given with a modification of the procedure given in the above example. Mixtures, all of which contain 30 percent by weight of calcium oxide as hydrated lime, together with chromium oxide and and aluminum oxide, as hydrated alumina, in the following respective percentages by weight: 69 to 1, 68 to 2, 66 to 4, 62 to 8, 54 to 16 were dry-pressed at 4500 pounds per square inch and fired to 1550° to 1600° C. Expansion tests from room temperature to 1400° C., hydration tests, shrinkage tests, and porosity tests were made on the five different compositions. In the expansion tests, it was found that the compositions over the entire range studied showed a lower average expansion rate than a refractory composition containing 30 percent by weight of calcium oxide and 70 percent by weight of chromium oxide wherein no aluminum oxide had been substituted for any of the chromium oxide. None of the compositions containing aluminum oxide slaked when boiled in water for two hours, and those compositions containing aluminum oxide up to 4 percent reduced the apparent porosity of the article made therefrom.

Calcium oxide melts at approximately 2572° C., chromium oxide melts at approximately 2300° C., and aluminum oxide melts at approximately 2050° C. In preparing the refractory bricks in accordance with the present invention which has unusual high load-bearing characteristics at high temperatures, that is, above 1600° C., it was found that a composition containing 3 percent by weight of aluminum oxide substituted for chromium oxide had a cone fusion point of 40 (approximately 1885° C.), as set forth in the first example, as compared with a calcium oxide-chromium oxide refractory containing no aluminum oxide, which had a cone fusion point of 41 (approximately 1970° C.). The high load-bearing qualities of the compositions described and claimed herein are substantially better than the same characteristics of high grade basic type refractories which show shear at much lower temperatures (below 1500° C.).

The refractories produced according to the present invention are adapted to be used where resistance to high melting point basic melts is required. Throughout the description reference has been made to the resistance of this refractory to fused rock phosphate. This index has been used since it has been found that fused rock phosphate containing approximately 45 percent by weight of calcium oxide is one of the most corrosive of fused basic materials which may be encountered at temperatures of the order of 1500° to 1550° C.

It will be seen, therefore, that this invention actually may be carried out by the use of various modifications and changes without departing from its spirit and scope.

I claim:

1. As an article of manufacture, a pressed and fired mixture substantially consisting of calcium oxide, chromium oxide and aluminum oxide in proportions corresponding to 40 to 60 mol percent, 59 to 20 mol percent and 1 to 20 mol percent, respectively.

2. A high melting point refractory, resistant to corrosion of basic material, which consists of a fired mixture of substantially calcium oxide, chromium oxide and aluminum oxide in proportions corresponding to 45 to 55 mol percent, 54 to 35 mol percent and 1 to 10 mol percent, respectively.

3. A high melting point refractory, resistant to corrosion of fused rock phosphate, which consists of a fired mixture of substantially calcium oxide, chromium oxide and aluminum oxide in proportions corresponding approximately to 54 mol percent, 43 mol percent and 3 mol percent, respectively.

GORDON R. POLE.